(12) United States Patent
Lee et al.

(10) Patent No.: US 7,623,451 B2
(45) Date of Patent: Nov. 24, 2009

(54) BANDWIDTH ALLOCATION DEVICE AND METHOD TO GUARANTEE QOS IN ETHERNET PASSIVE OPTICAL ACCESS NETWORK

(75) Inventors: Sang Woo Lee, Daejeon (KR); Yool Kwon, Busan (KR); Bong Tae Kim, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 464 days.

(21) Appl. No.: 11/505,514

(22) Filed: Aug. 16, 2006

(65) Prior Publication Data

US 2007/0133557 A1    Jun. 14, 2007

(30) Foreign Application Priority Data

Dec. 5, 2005    (KR) ...................... 10-2005-0117779

(51) Int. Cl.
*H04J 1/16* (2006.01)
(52) U.S. Cl. ...................... 370/230; 370/236; 370/395.4
(58) Field of Classification Search ................. 370/230, 370/236, 395.4, 431, 445
See application file for complete search history.

(56) References Cited

U.S. PATENT DOCUMENTS 6,546,014 B1    4/2003    Kramer et al.

| 2003/0137975 | A1* | 7/2003 | Song et al. ................... 370/353 |
|---|---|---|---|
| 2003/0177215 | A1* | 9/2003 | Sutherland et al. .......... 709/223 |
| 2004/0057462 | A1 | 3/2004 | Lim et al. |
| 2004/0057727 | A1* | 3/2004 | Lim et al. ...................... 398/58 |
| 2004/0252714 | A1* | 12/2004 | Oh et al. ...................... 370/437 |
| 2005/0008158 | A1* | 1/2005 | Huh et al. .................... 380/256 |
| 2005/0047783 | A1* | 3/2005 | Sisto et al. ..................... 398/71 |

FOREIGN PATENT DOCUMENTS

| JP | 2003-087282 | 9/2001 |
|---|---|---|
| JP | 2003-078561 | 3/2003 |
| JP | 2004-289780 | 10/2004 |
| KR | 1020030073473 | 9/2003 |
| KR | 1020040108135 | 12/2004 |

* cited by examiner

*Primary Examiner*—Chirag G Shah
*Assistant Examiner*—Minh-Trang Nguyen
(74) *Attorney, Agent, or Firm*—Blakely Sokoloff Taylor & Zafman (57) ABSTRACT

The present invention provides a device and method for allocating a bandwidth to a plurality of optical network units (ONUs) for transmitting an uplink frame in the EPON. The bandwidth allocation device includes a plurality of optical network units and an optical line terminal (OLT). The optical network units classify uplink data to be transmitted to an optical line terminal according to a predetermined priority, and transmit the classified uplink data by receiving an allocated bandwidth according to each class from the optical line terminal. The optical line terminal preferentially distributes a predetermined bandwidth for transmitting uplink frames of a highest priority class to the optical network units and then dynamically distributes a remained bandwidth form transmitting the uplink frames for remained classes.

23 Claims, 8 Drawing Sheets

| | current cycle | previous cycle |
|---|---|---|
| EF queue | $Q_{EF}(n)$ | $Q_{EF}(n-1)$ |
| AF queue | $Q_{AF}(n)$ | $Q_{AF}(n-1)$ |
| BE queue | $Q_{BE}(n)$ | $Q_{BE}(n-1)$ |

| ONU No. | EF queue | AF queue | | | BE queue |
|---|---|---|---|---|---|
| 1 | $RB_{EF}(1)$ | $RB_{AF}(1)$ | $AF_{min}(1)$ | $AF_{max}(1)$ | $RB_{BE}(1)$ |
| 2 | $RB_{EF}(2)$ | $RB_{AF}(2)$ | $AF_{min}(2)$ | $AF_{max}(2)$ | $RB_{BE}(2)$ |
| ⋮ | ⋮ | ⋮ | ⋮ | ⋮ | ⋮ |
| n | $RB_{EF}(n)$ | $RB_{AF}(n)$ | $AF_{min}(n)$ | $AF_{max}(n)$ | $RB_{BE}(n)$ |

BANDWIDTH ALLOCATION DEVICE AND METHOD TO GUARANTEE QOS IN ETHERNET PASSIVE OPTICAL ACCESS NETWORK

RELATED APPLICATIONS

The present application is based on, and claims priority from, Korean Application Number 2005-0117779, filed Dec. 5, 2005, the disclosure of which is incorporated by reference herein in its entirety

BACKGROUND OF THE INVENTION

1. Field of the Invention

The present invention relates to an Ethernet passive optical access network (EPON), and more particularly, to a device and method for allocating a bandwidth to a plurality of optical network units (ONU) for transmitting an uplink frame in the EPON where a plurality of ONUs is connected to one optical line terminal (OLT).

2. Description of the Prior Art

Generally, an access network is a communication channel between a service provider, such as a central office CO, a Head-End or a point-of-present (POP), and subscribers that receive services from the service provider.

Recently, an xDSL network and a Hybrid Fiber Coaxial (HFC) network are mainly used as the access network, wherein the xDSL may be an asymmetric digital subscriber line (ADSL) or a very high data rate digital subscriber line (VDSL) that mainly delivers low-speed data and voice data, and the HFC network may be a cable broadcasting network. Due to the development of high speed Internet, high speed local area network (LAN) and Home network and the introduction of various applications for voice, data and multimedia stream, the bandwidth required for the access network has been rapidly increasing, and the xDSL network using a typical telephone line and the HFC network using a coaxial cable have failed to accommodate the requirement of bandwidth of the access network.

As described above, various services, such as video on demand (VOD), cable television (CATV) and high definition television (HDTV), have been explosively increasing, and an access network using an optical line has been noted for an environment of a broadband convergence network (BcN) where high-speed Internet traffic and communication and broadcasting data are merged. Especially, a passive optical network (PON) has been recognized as the most suitable alternative for a Fiber To The x (FTTx) in economical, technological and evolutional view of a communication network.

Although the technology of the PON was developed for an asynchronous transfer mode (ATM) network in its early stages, the ATM based PON (APON) was not widely used because of several shortcomings, such as high complexity, high cost, increment of Ethernet based access traffic and difficulty of accommodating video service. Recently, the standard of an Ethernet PON (EPON) was completely defined based on a task force of IEEE 802.2ah Ethernet in the first mile (EFM). Since the EPON technology transmits an Ethernet frame through a passive optical line between the central office (CO) and subscribers without changing a protocol, the EPON technology has the advantage of price competitiveness compared to the telephone or the coaxial cable based network. Due to such an advantage, many researches have been recently progressing for developing the EPON technology, and various manufacturers have been producing chips conforming to the EPON standard. Especially, the optical access network employing the EPON has been recently widely spread.

Figure 1:
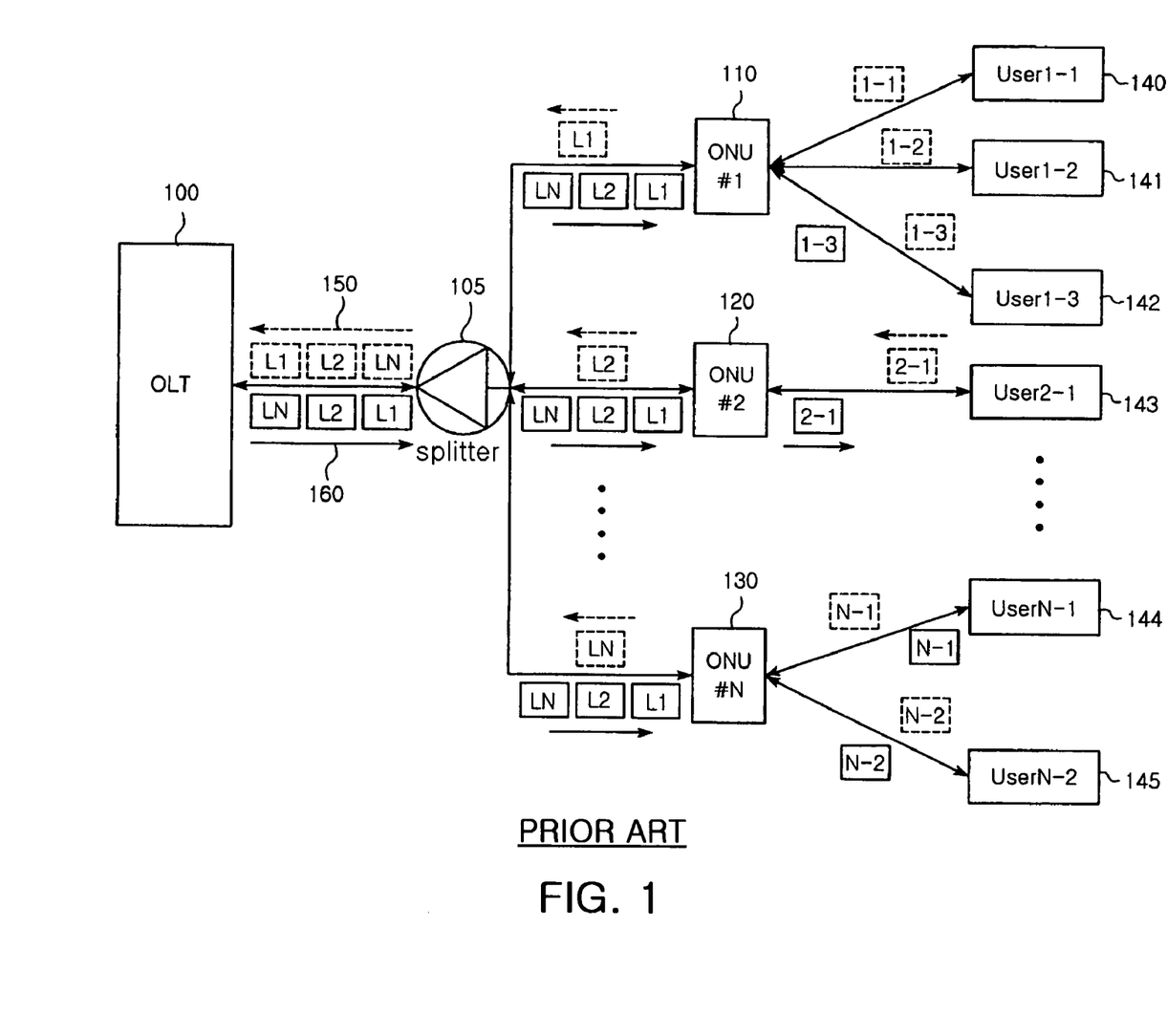
FIG. 1 is a block diagram illustrating a structure and an operation for transmitting uplink data and downlink data in an Ethernet passive optical network (EPON) according to the related art.

FIG. 1 is a block diagram illustrating a structure and an operation for transmitting uplink data and downlink data in an Ethernet passive optical network (EPON) according to the related art.

Referring to FIG. 1, the Ethernet passive optical network (EPON) includes an optical line terminal 100, a splitter 105 and optical network units (ONU) 110, 120 and 130. The EPON has a point-to-multipoint structure where a plurality of optical network units 110, 120 and 130 share the optical line terminal 100 through a single optical line. That is, downlink transmission transmits data from the OLT 100 to the ONUs 110, 120 and 130 based on a broadcasting scheme. On the contrary, uplink transmission transmits data from a plurality of the ONUs 110, 120 and 130 to the OLT 100 based on a multipoint-to-point scheme.

The optical line terminal 100 is located at the center office (CO). The optical network units (ONU) 110, 120 and 130 concentrate subscriber frames generated from subscriber terminals 140 to 145. The subscriber terminals 140 to 145 may be connected to a home gateway (HG) placed inside a house, and the home gateway may be connected to a set top box (STB), a personal computer (PC), the internet telephone (VoIP) or etc. The splitter 105 forms an optical distributing network between the OLT 100 and a plurality of the ONUs 110, 120 and 130 by connecting the single OLT 100 to a plurality of the ONUs 110, 120 and 130 in a one-to-N manner. In the EPON, the downlink frame 160 is processed similarly to a conventional Ethernet frame in that the downlink frame 160 is transmitted using the broadcasting scheme. However, a plurality of ONUs 110, 120 and 130 transmit the uplink frame 150 to the single OLT 110. For example, one ONU 110 shares network resources with other ONUs 120 and 130 in the EPON in order to transmit the uplink frame L1, and the OLT 100 controls the ONUs 110, 120 and 130's rights to access the shared network resource. Therefore, in a tree-structured EPON, a fair and effective bandwidth allocation method and a multi point control protocol which is a MAC protocol are used in order to prevent collision which may occur in the uplink data transmission and allocate a bandwidth. In the uplink data transmission, the simplest method of allocating the bandwidth is a static bandwidth allocation (SBA) method that equally allocates same bandwidths to all of registered optical network units 110, 120 and 130. However, the static bandwidth allocation (SBA) method has disadvantages in that the SBA method has difficulty to support the Quality of Service (QoS) and the SBA may not allocate bandwidth differently according to the optical network units 110, 120 and 130 although there is enough margin in the entire bandwidth. In order to overcome the disadvantages of the SBA method, dynamic bandwidth allocation (DBA) methods were introduced, and an interleaved polling with adaptive cycle time (IPACT) method is the representative method for the DBA methods. For example, in IPACT method, the OLT 100 transmits a GATE message to a next ONU 120 using the downlink transmission before the ONU 110 having the current right of transmission ends the last transmission. That is, the IPACT method can perform the dynamic bandwidth allocation by informing the OLT 100 of buffer information of the ONUs 110, 120 and 130 when each of the optical network units 110, 120 and 130 transmits the uplink data according to the gate message transmitted from the OLT 100. Such an IPACT method has an advantage in that the available of link is improved using statistical multiplexing. However, the IPACT method has difficulties to provide a service that is very sensitive to jitter or delay because a polling cycle varies. Accordingly, researches for developing an allocation scheme using a regular polling have been attempted to support QoS. However, the allocation scheme using a regular polling may waste the bandwidth because the bandwidth is allocated in advance.

SUMMARY OF THE INVENTION

The present invention provides a bandwidth allocation device and method to guarantee QoS in Ethernet passive optical access network that substantially obviates one or more problems due to limitations and disadvantages of the related art.

An object of the present invention is to provide a bandwidth allocation device and method for guaranteeing link efficiency for an uplink frame which is transmitted from an optical network unit (ONU) to an optical line terminal (OLT) and for satisfying QoS in an Ethernet passive optical network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating bandwidth for guaranteeing QoS (quality of service) in an Ethernet passive optical network, includes: at a plurality of optical network units, classifying uplink frames to be transmitted to an optical line terminal into a plurality of classes according to a predetermined priority, and requesting a bandwidth required according to the classes to the optical line terminal; at the optical line terminal, allocating the requested bandwidth for the highest priority class among the plurality of classes; and at the optical line terminal, dynamically allocating bandwidths for other classes using the remained bandwidth after allocating the requested bandwidth to the highest priority class.

According to an aspect of the present invention, there is provided a device for allocating bandwidth to guarantee QoS (quality of service) in an Ethernet passive optical network, the device including: a plurality of optical network units for classifying uplink data to be transmitted to an optical line terminal into a plurality of classes according to a predetermined priority and transmitting the classified uplink data, and receiving an allocated bandwidth required for each of the classes from the optical line terminal; and an optical line terminal for distributing bandwidths required for a highest priority class among the classes from an entire available uplink bandwidth to the optical network units and dynamically distributing bandwidths for other classes using the remained bandwidth of the available uplink bandwidth.

According to another aspect of the present invention, there is provided an optical network unit including: a plurality of priority queues for classifying uplink data to be transmitted to an optical line terminal into a plurality of classes according to a predetermined data priority, and storing the classified uplink data; and a scheduler for transmitting the uplink data stored in the priority queue according to bandwidth allocation information received from the optical line terminal, wherein a bandwidth allocated from the optical line terminal is allocated by distributing bandwidths required for a highest priority class among the classes from an entire available uplink bandwidth and dynamically distributing bandwidths for other classes using the remained bandwidth of the available uplink bandwidth.

According to still another aspect of the present invention, there is provided an optical line terminal including: a storing unit for classifying uplink frames to be transmitted from a plurality of optical network units into a plurality of classes according to a predetermined priority, and storing a bandwidth managing table containing information about bandwidths requested according to predetermined priorities for each of the optical network units; and a bandwidth allocating unit for distributing bandwidths required for a highest priority class among the classes from an entire available uplink bandwidth and dynamically distributing bandwidths for other classes using the remained bandwidth of the available uplink bandwidth.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF THE PREFERRED EMBODIMENTS

Reference will now be made in detail to the preferred embodiments of the present invention, examples of which are illustrated in the accompanying drawings.

Figure 2:
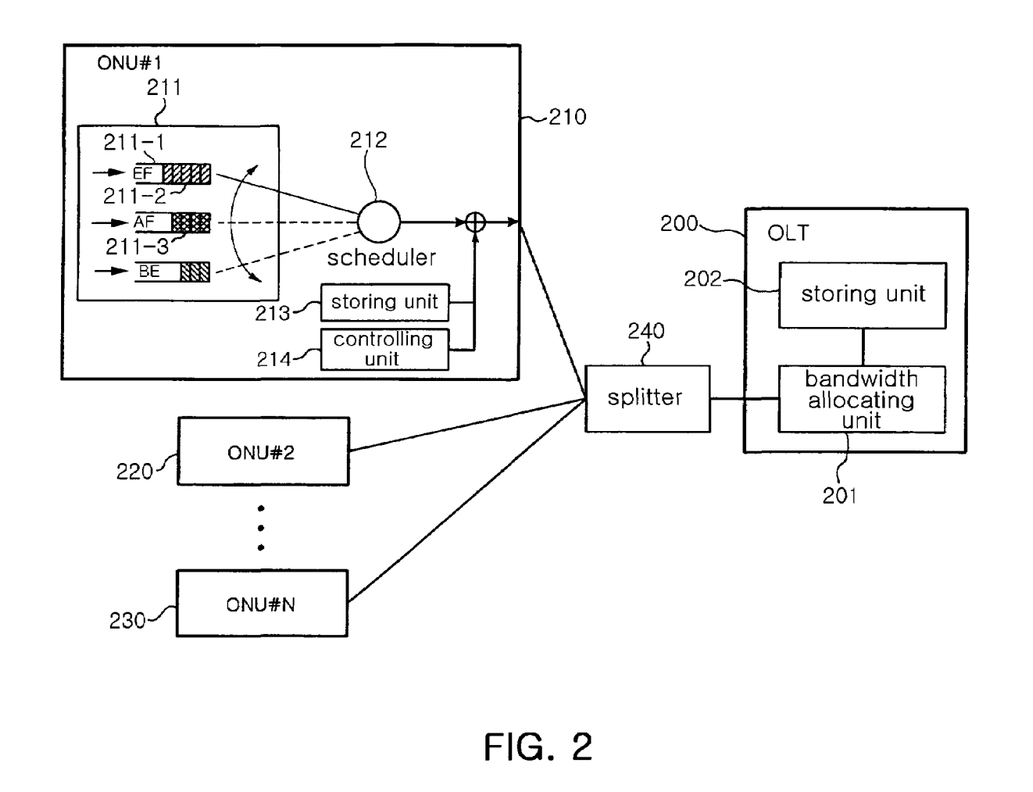
FIG. 2 is a block diagram illustrating a bandwidth allocation device for guaranteeing QoS in an Ethernet passive optical network (EPON) according to an embodiment of the present invention.

FIG. 2 is a block diagram illustrating a bandwidth allocation device for guaranteeing QoS in an Ethernet passive optical network (EPON) according to an embodiment of the present invention.

Referring to FIG. 2, the bandwidth allocation device for guaranteeing QoS in an Ethernet passive optical network (EPON) according to the present embodiment includes a plurality of optical network units (ONU) 210 to 230 and an optical line terminal (OLT) 200. An optical distribution network is formed between the OLT 200 and a plurality of the ONUs 210 to 230 by connecting the single OLT 200 to a plurality of the ONUs 210 to 230 through a splitter 240 in a one-to-N manner.

Each of the optical network units (ONU) 210 to 230 includes a plurality of priority queues 211, an optical network unit (ONU) scheduler 212, a storing unit 213 and a controlling unit 214. A plurality of user terminals (not shown) are connected to each of the ONUs 210 to 230, and uplink frames inputted from each of the user terminals are classified into a plurality of classes according to their priority. For example, frames inputted from user terminals may be classified into an expedited forwarding class, an assured forwarding class and a best effort class. The expedited forwarding class is the highest priority class assigned to frames that require a guaranteed service and provide a service that sensitive to delay and jitter. The assured forwarding class (AF) is the next highest priority class assigned to frames that provide a service which is less sensitive to delay and jitter compared to the EF class and sensitive to packet loss. The best effort class is assigned to frames that provide a best-effort service which is less sensitive to delay, jitter and packet loss compared to the EF class and the AF class.

The plurality of priority queues 211 store the frames inputted from the user terminals into corresponding priority queues 211-1 to 211-3. For example, frames classified into the EF class are stored in the EF queue 211-1, and frames classified into the AF class are stored in the AF queue 211-2. Frames classified into the BE class are stored in the BE frame 211-3.

The ONU scheduler 212 transmits the uplink data stored in the priority queue 211 to the OLT 200 according to information about uplink bandwidth allocation included in a received GATE frame from the OLT 200.

The storing unit 213 stores a queue state managing table for analyzing cyclic queue state information of the priority queues 211-1, 211-2 and 211-3. The cyclic queue state information may use the number of bytes in frames stored in each of the priority queues 211-1, 211-2 and 211-3. The queue state managing table will be described in detail with reference to FIG. 4 in later.

The controlling unit 214 calculates a bandwidth to request to the OLT 200 using the queue state information of each of the priority queue 211-1, 211-2 and 211-3 that is obtained through analyzing the queue state managing table. The information about requesting bandwidth is transmitted to the OLT through a REPORT message.

The optical line terminal (OLT) 200 includes a bandwidth allocating unit 201 and a storing unit 202.

The bandwidth allocating unit 201 calculates an uplink bandwidth required to the class queue 211 in each of ONUs 210, 220 and 230 using the received REPORT frame from the ONUs 210, 220 and 230. Then, the bandwidth allocating unit 201 splits off the required bandwidth for the highest priority class (EF class) from an available entire uplink bandwidth. Then, the bandwidth allocating unit 201 dynamically distributes bandwidth to other classes, for example, AF class and BE class using a bandwidth remained after splitting off the required bandwidth for the highest priority class from the available entire uplink bandwidth according to the present invention. The allocating amount of the uplink bandwidth calculated according to each class of ONUs 210, 220 and 230 by the bandwidth allocating unit 211 is transmitted to the ONUs 210, 220 and 230 through the GATE message. The ONUs 210, 220 and 230 receives the GATE frame, and the ONU scheduler 212 transmits the uplink frames stored in the queue 211 to the OLT 200 according to the bandwidth allocating information included in the received GATE message. The operations for allocating the bandwidth according to the present embodiment will be described in detail, hereinafter.

The storing unit 212 stores a bandwidth managing table that contains information about requiring amounts of bandwidth according to priorities for each of the ONUs 210, 220 and 230. The bandwidth managing table will be described in more detail with reference to FIG. 6 in later.

Figure 3:
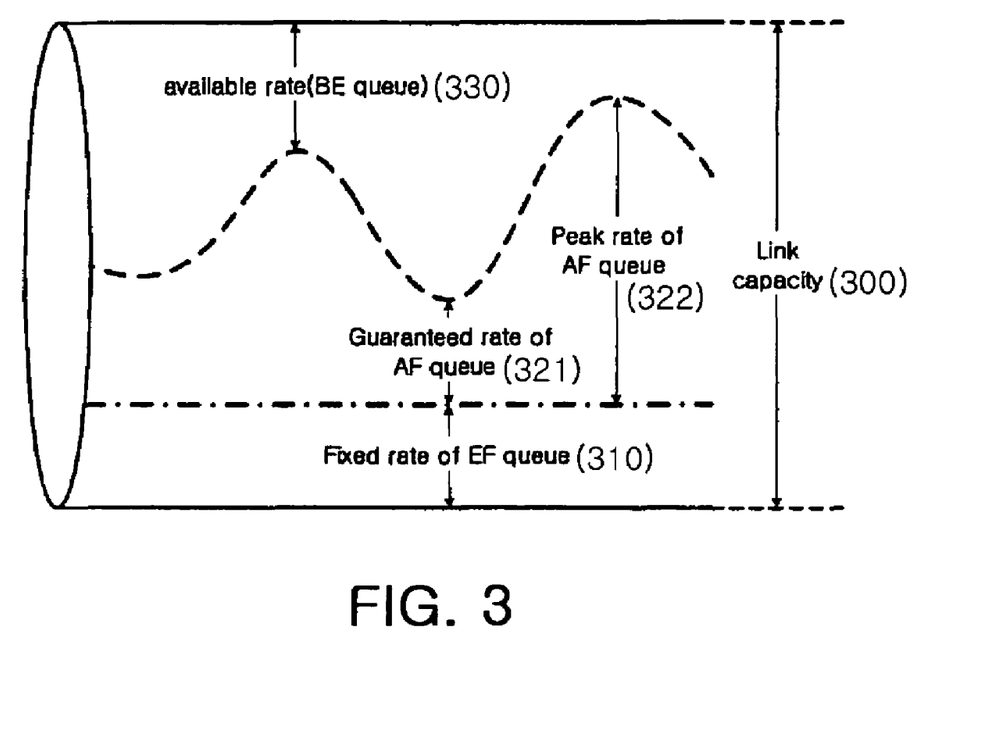
FIG. 3 is a view illustrating a bandwidth requested according to each of service classes according to an embodiment of the present invention.

FIG. 3 is a view illustrating a bandwidth requested according to each of service classes according to an embodiment of the present invention.

Referring to FIG. 3, in the present invention, the EF service requests the guarantee of bandwidth so that a fixed bandwidth (Fixed rate of EF queue 310) among the entire available link capacity 300 is allocated for the EF service according to the request of ONU. On the contrary, the AF service and the BE service request a variable bandwidth. That is, the AF service requests the guarantee of a minimum bandwidth although the AF service uses a variable bandwidth. Also, the bandwidth of the AF service may be previously defined not to be greater than a predetermined maximum bandwidth by defining the maximum bandwidth (peak rate of the AF queue 322) to be used for the AF service based on agreement between a service provider and a subscriber. Furthermore, the BE service does not request the guarantee of a minimum bandwidth although the BE service also request the variable bandwidth (available rate of BE queue 330).

Figure 4:
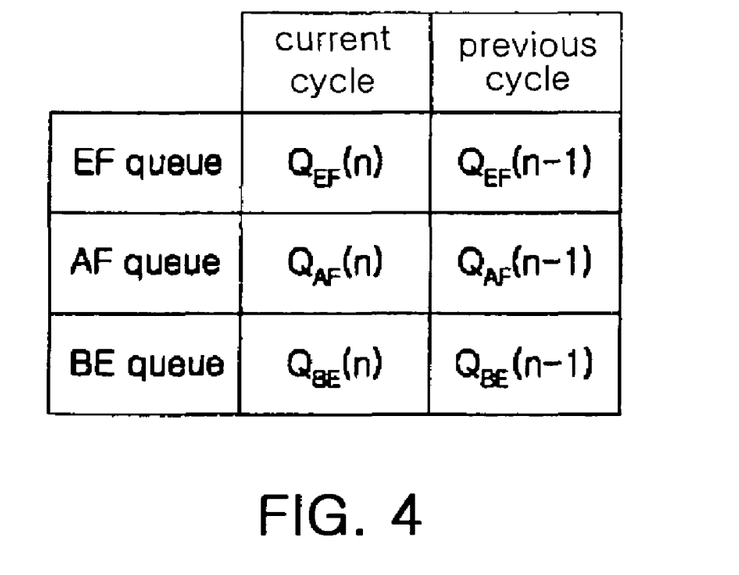
FIG. 4 shows a queue state table for managing states of each priority queue in optical network units according to an embodiment of the present invention.

FIG. 4 shows a queue state table for managing states of each priority queue in optical network units according to an embodiment of the present invention.

Referring to FIG. 4, the storing unit 213 of each ONU 210 stores a queue state managing table in order to understand a cyclic queue state information about each of the priority queues 211-1, 211-2 and 211-3. As the queue state information, the number of bytes of frames stored in the each priority queue 211-1, 211-2 and 211-3 may be used. As shown in FIG. 4, the queue state table stores a previous cycle's queue states for each of the priority queue 211-1, 211-2 and 211-3 and a current cycle's for each of the priority queue 211-1, 211-2 and 211-3. In Table shown in FIG. 4, $Q_{EF}(n)$ denotes a state of an EF queue 211-1 in an $n^{th}$ cycle, and $Q_{EF}(n-1)$ denotes a state of an EF queue 211-1 in an $(n-1)^{th}$ cycle. And, the controlling unit 214 in the ONU 210 calculates a bandwidth to request to the OLT 200 using the queue state information for each of the priority queues 211-1, 211-2 and 211-3. After calculating, the controlling unit 214 transmits the calculated bandwidth to the OLT 200 through the REPORT message. The REPORT message may calculate a bandwidth requested to the OLT 200 using following Eq. 1.

$$RB_{EF}(n) = Q_{EF}(n)$$

$$RB_{AF}(n) = \alpha Q_{AF}(n) + (1-\alpha) Q_{AF}(n-1) \qquad \text{Eq. 1}$$

$$RB_{BE}(n) = Q_{BE}(n)$$

In Eq. 1, $RB_{EF}(N)$ denotes a bandwidth requested by the EF queue at an $n^{th}$ cycle. And, $\alpha$ denotes a value in a range of $0 < \alpha \leq 1$.

Herein, the bandwidth for the AF class is requested not to exceed the maximum bandwidth that is clearly defined at a service level agreement (SLA) between a service provider and a subscriber. If the bandwidth requested for each of the classes is decided, the REPORT message shown in FIG. 5 is transmitted to the OLT 200.

Figure 5:
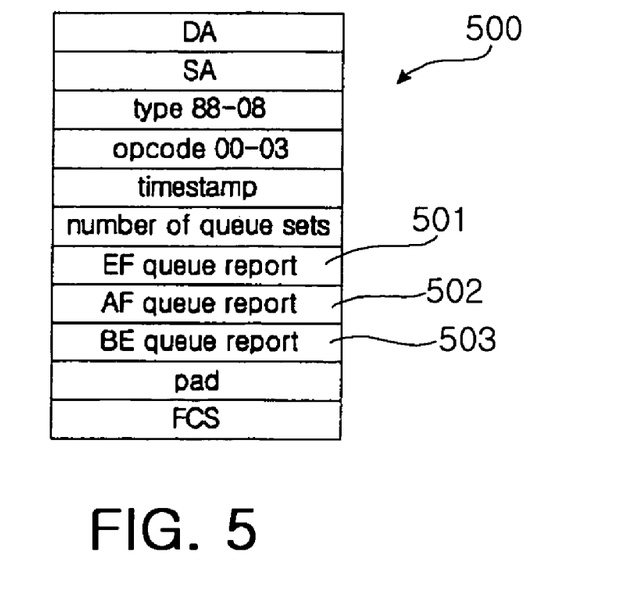
FIG. 5 shows a structure of a REPORT message according to an embodiment of the present invention.

FIG. 5 shows a structure of a REPORT message according to an embodiment of the present invention.

Referring to FIG. 5, the REPORT message 500 according to the present embodiment includes fields having information about a destination address (DA), a source address (SA), a type (type 88-08), an OPCODE (opcode 00-03), a time stamp (timestamp), the number of queue sets (number of queue sets), an EF queue REPORT (EF queue report) 501, an AF queue REPORT (AF queue report) 502 and a BE queue REPORT (BE queue REPORT) 503, a pad (pad) and a frame check sequence (FCS). Herein, the EF queue REPORT field 501 contains information related to a bandwidth requested by the EQ queue 211-1 at an $n^{th}$ cycle. The AF queue REPORT field 502 contains information related to a bandwidth requested by the AF queue 211-2 at an $n^{th}$ cycle, and the BE queue REPORT field 503 contains information related to a bandwidth requested by the BE queue 211-3 at an $n^{th}$ cycle.

Then, the OLT 200 analyzes the requested bandwidth from the REPORT message inputted from each of the ONUs 210, 220 and 230 and allocates bandwidths to the ONUs 210, 220 and 230 according to the analysis result. After allocating, the OLT 200 transmits the result of the allocation to each of the ONUs 210, 220 and 230 using a GATE message.

Figure 6:
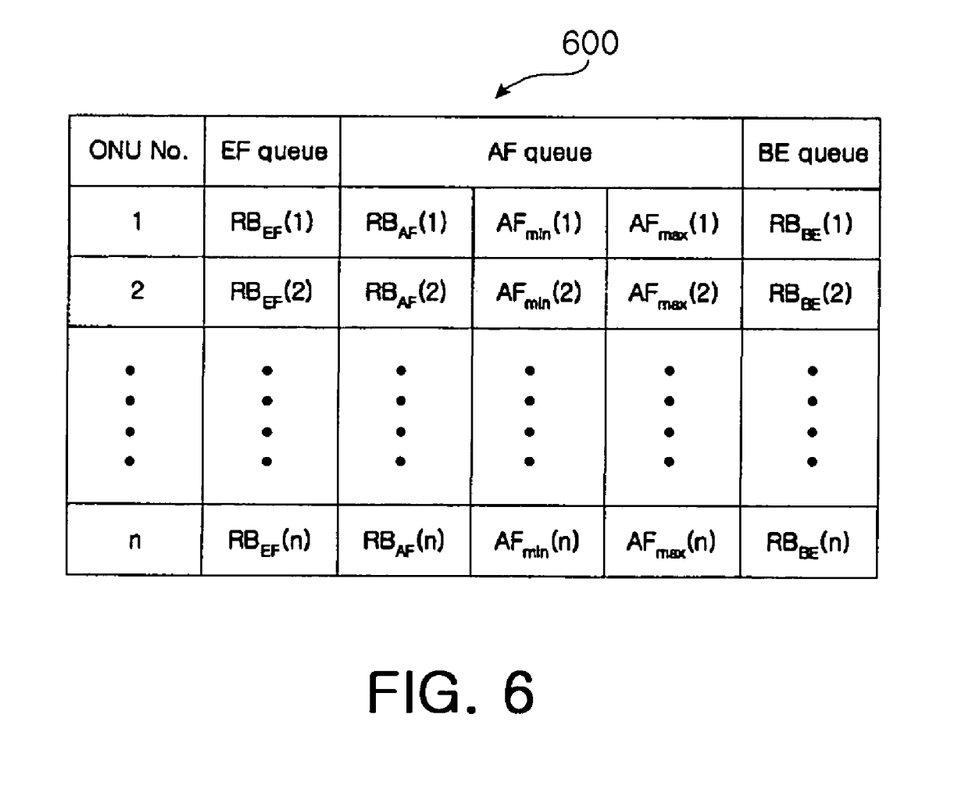
FIG. 6 shows a bandwidth managing table for managing bandwidths requested by ONUs at an OLT according to an embodiment of the present invention.

FIG. 6 is a bandwidth managing table for managing bandwidths requested by ONUs at an OLT according to an embodiment of the present invention.

Referring to FIG. 6, the bandwidth managing table 600 stores information about the requested bandwidth according to each of the priority queue 211-1, 211-2 and 211-3 in the ONUs 210, 220 and 230. In Table of FIG. 6, $RB_{EF}(n)$ denotes a bandwidth requested by an EF queue 211-1 of an $n^{th}$ ONU, $RB_{AF}(n)$ denotes a bandwidth requested by an AF queue 211-2 of an $n^{th}$ ONU, and $RB_{BE}(n)$ denotes a bandwidth requested by an BE queue 211-3 of an $n^{th}$ ONU. And, $AF_{MIN}(n)$ denotes a minimum guaranteed bandwidth requested by an $n^{th}$ ONU, which is clearly defined in the SLA between the subscriber and the service provider. $AF_{MAX}(n)$ denotes a maximum guaranteed bandwidth requested by an $n^{th}$ ONU, which is clearly defined in the SLA between the subscriber and the service provider. The OLT 200 performs bandwidth allocation for the ONU 210, 220 and 230 based on the bandwidth managing table 600. The allocation of bandwidth is performed at a regular cycle. That is, the OLT 200 allocates corresponding bandwidths to the ONU 210, 220 and 230 at a predetermined cycle as follows.

Figure 7:
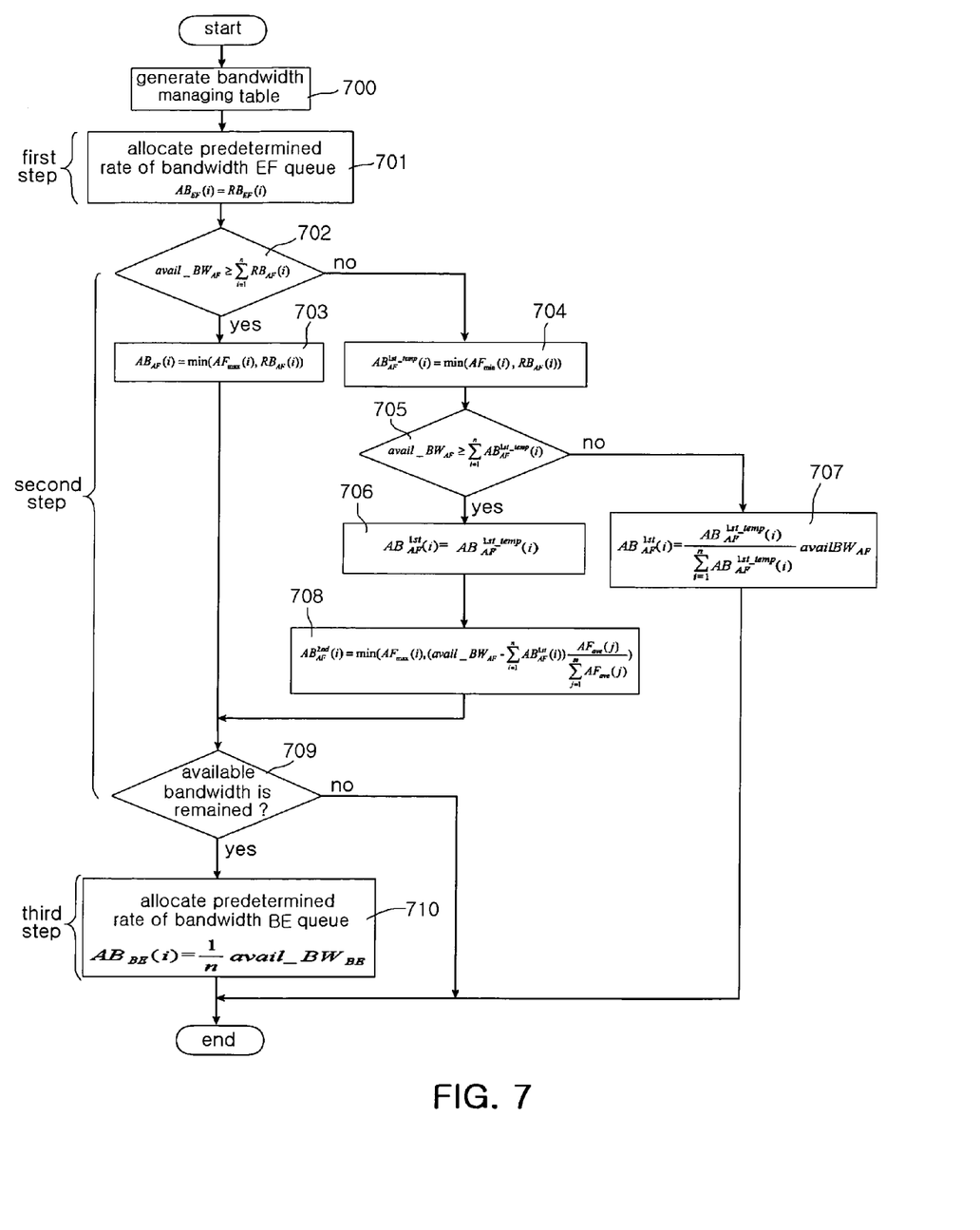
FIG. 7 is a flowchart showing a method for allocating bandwidth to guarantee QoS in an Ethernet passive optical network according to an embodiment of the present invention.

FIG. 7 is a flowchart showing a method for allocating bandwidth to guarantee QoS in an Ethernet passive optical network according to an embodiment of the present invention.

Referring to FIG. 7, in order to allocate a bandwidth according to the present embodiment, the OLT 200 generates the bandwidth managing table 600 by colligating REPORT information about all of optical network units 210, 220 and 230 connected to the OLT 200 in operation S700. Then, the ONUs 210, 220 and 230 request bandwidth required for each class to the OLT 200 according to a plurality of classes that classifies uplink frames to be transmitted to the OLT 200 according to a predetermined priority. Then, the OLT 200 performs bandwidth allocation to each of the ONUs 210, 220 and 230 according to following three operations.

As a first operation of allocating the bandwidth, the OLT 200 allocates a bandwidth to a queue having the highest priority, that is, the EF queue 211-1, among a plurality of priority queues 211-1, 211-2 and 211-3 in the ONUs 210, 220 and 230 based on following Eq. 2 in operation S701.

$$AB_{EG}(i) = RB_{EF}(i) \qquad \text{Eq. 2}$$

In Eq. 2, $AB_{EF}(i)$ denotes a bandwidth allocated to the EF queue of an $i^{th}$ ONU, and $RB_{EF}(i)$ denotes a bandwidth requested by the EF queue of an $i^{th}$ ONU. Therefore, the bandwidth allocated to EF queues in all ONUs may be expressed as following Eq. 3.

$$AB_{EF} = \sum_{i=1}^{n} AB_{EF}(i) \qquad \text{Eq. 3}$$

As a second operation for allocating the bandwidth, as shown in FIG. 7, a bandwidth is allocated to a next highest priority class, that is, the AF queue 211-2, with the available bandwidth of the entire link remained after allocating the bandwidth to the EF queens 211-1 in the ONUs 210, 220 and 230. The remained bandwidth ($\text{avail\_BW}_{AF}$) available to be allocated to the AF queue 211-2 may be expressed as following Eq. 4.

$$\text{avail\_BW}_{AF} = C - AB_{EF} \qquad \text{Eq. 4}$$

In Eq. 4, C denotes the available link capacity of entire bandwidth.

In the second operation for allocating the bandwidth, it calculates a sum of bandwidth ($RB_{AF}(i)$) requested by the AF queues 211-2 for the AF class from each of the ONUs 210, 220 and 230 at first, and it determines whether the sum of the requested bandwidth ($RB_{AF}(i)$) is smaller than or equal to the available bandwidth ($\text{avail\_BW}_{AF}$) to be allocated to the AF queue 211-2 or not in operation S702.

If the sum of the requested bandwidth ($RB_{AF}(i)$) is smaller than or equal to the available bandwidth ($\text{avail\_BW}_{AF}$) in the operation S702, the bandwidth requested by each of the ONUs 210, 220 and 230 is compared with the previously defined maximum bandwidth according to corresponding ONUs 210, 220 and 230, as shown in Eq. 5, and a smaller value between the requested bandwidth by each of the ONUs 210, 220 and 230 and the previously defined maximum bandwidth to corresponding ONUs 210, 220 and 230 is allocated to corresponding ONUs 210, 220 and 230 in operation S703.

$$\text{if } \text{avail\_BW}_{AF} \geq \sum_{i=1}^{n} RB_{AF}(i) AB_{AF}(i) = \min(AF_{max}(i), RB_{AF}(i)) \qquad \text{Eq. 5}$$

Herein, n denotes the number of ONUs requesting the bandwidth for the AF queue.

If the sum of the requested bandwidth ($RB_{AF}(i)$) of the AF queue 211-2 requested from each of the ONUs 210, 220 and 230 is greater than the available bandwidth ($\text{avail\_BW}_{AF}$) to be allocated to the AF queue 211-2, smaller values between the minimum guaranteed bandwidths of each of the ONUs 210, 220 and 230 and the requested bandwidths by each of the ONUs 210, 220 and 230 are obtained by comparing them, as shown in Eq. 6, in operation S704 as a first step. Then, it determines whether the sum of the obtained smaller values is smaller than or equal to the available bandwidth ($\text{avail\_BW}_{AF}$) in operation S705.

$$AB_{AF}^{1st\_temp}(i) = \\ \min(AF_{min}(i), RB_{AF}(i)) \text{ if } \text{avail\_BW}_{AF} \geq \sum_{i=1}^{n} AB_{AF}^{1st\_temp}(i) \quad \text{Eq. 6}$$

If the sum of the smaller values between the minimum guarantee bandwidths of each of the ONUs 210, 220 and 230 and the required bandwidths by each of the ONUs 210, 220 and 230 is smaller than or equal to the available bandwidth (avail_BW$_{AF}$) to be allocated to the AF queue 211-2 in operation S705, smaller values between the minimum guaranteed bandwidths and the requested bandwidths by the ONUs 210, 220 and 230 are allocated to each of the ONUs 210, 220 and 230 as shown in Eq. 7.

$$AB_{AF}^{1st}(i) = AB_{AF}^{1st\_temp}(i) \quad \text{Eq. 7}$$

On the contrary, if the sum of the smaller values between the minimum guaranteed bandwidths of each of the ONUs 210, 220 and 230 and the requested bandwidths by each of the ONUs 210, 220 and 230 is greater than the available bandwidth (avail_BW$_{AF}$) to be allocated to the AF queue 211-1 in operation S705, a bandwidth is allocated to each of the ONUs 210, 220 and 230 in proportional to smaller values between the minimum guaranteed bandwidths of each of the ONUs 210, 220 and 230 and the requested bandwidths by each of the ONUs 210, 220 and 230 analyzed as shown in Eq. 8 in operation S707.

$$AB_{AF}^{1st}(i) = \frac{AB_{AF}^{1st\_temp}(i)}{\sum_{i=1}^{n} AB_{AF}^{1st\_temp}(i)} \text{availBW}_{AF} \quad \text{Eq. 8}$$

As a second step, the remained bandwidth is allocated to ONUs excepting ONUs requesting a bandwidth smaller than the predetermined minimum guaranteed bandwidth among the ONUs 210, 220 and 230 in proportional to the minimum guaranteed bandwidth as shown in Eq. 9 in operation S708.

$$AB_{AF}^{2nd}(i) = \\ \min\left(AF_{max}(i), \left(\text{avail\_BW}_{AF} - \sum_{i=1}^{n} AB_{AF}^{1st}(i)\right) \frac{AF_{ave}(j)}{\sum_{j=1}^{n} AF_{ave}(j)}\right) \quad \text{Eq. 9}$$

In Eq. 9, n denotes the number of ONUs requesting bandwidth for AF queue, and m denotes the number of ONUs excepting the ONU requesting a smaller bandwidth than the predefined minimum guaranteed bandwidth. AF$_{ave}$ denotes an average value of AF$_{min}$ and AF$_{max}$.

Therefore, the bandwidth allocated to the AF queues 211-2 of ONUs 210, 220 and 230 may be expressed as following Eq. 10.

$$AB_{AF} = \sum_{i=1}^{n} AB_{AF}^{1st}(i) + \sum_{j=1}^{m} AB_{AF}^{2nd}(j) \quad \text{Eq. 10}$$

After allocating bandwidth to the ONUs as described above, it is determined whether an available bandwidth is remained in operation S709. If an available bandwidth is remained after allocating bandwidth to the ONUs in the first and the second step as described above, a third step of allocating bandwidth is performed. An available bandwidth (avail_BW$_{BE}$) to be allocated to the BE class queue can be expressed by following Eq. 11.

$$\text{avail\_BW}_{BE} = C - AB_{EF} - AB_{AF} \quad \text{Eq. 11}$$

The OLT 200 allocates uniform bandwidth to the all BE class queues as shown in Eq. 122 in operation 710.

$$AB_{BE}(i) = \frac{1}{n}\text{avail\_BW}_{BE} \quad \text{Eq. 12}$$

Herein, n denotes the number of ONUs requesting the bandwidth for BE class queue.

Finally, the bandwidth allocated to an ONU (i) may be expressed by following Eq. 13.

$$AB(i) = AB_{AF}(i) + AB_{EF}(i) + AB_{BE}(i)$$
$$AB_{static}(i) = AB_{AF}(i)$$
$$AB_{dynamic}(i) = AB_{EF}(i) + AB_{BE}(i) \quad \text{Eq. 13}$$

Figure 8:
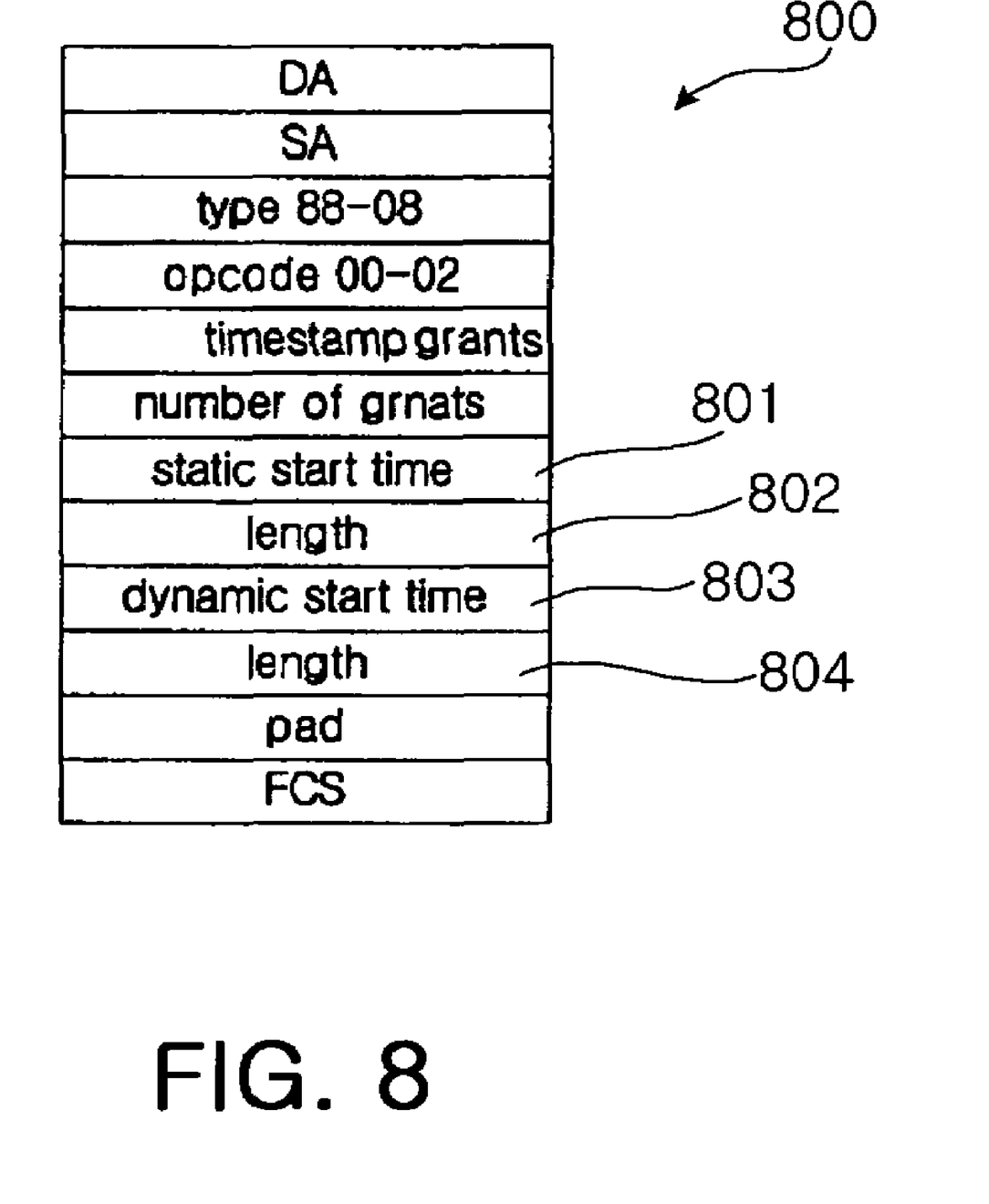
FIG. 8 shows a structure of a GATE message according to an embodiment of the present invention.

FIG. 8 shows a structure of a GATE message according to an embodiment of the present invention.

Referring to FIG. 8, the GATE message 800 according to the present embodiment includes information about a destination address (DA), a source address (SA) a type (type 88-08), an opcode (opcode 00-13), a time stamp (timestamp), the number of grants (number of grants), a static start time (static start time) 801, a length (length) 802, a dynamic start time (dynamic start time) 803, a length (length) 804, a pad (pad) and a frame check sequence (FCS).

The static start time field 801 contains information about the time to allocate bandwidth to the EF queue 211-1 according to the present embodiment, and the length field 802 contains information about the corresponding length of the time. The dynamic start time field 803 includes information about the time for allocating bandwidth for AF and BE queues 211-2 and 211-3 according to the present embodiment, and the length field 804 includes the information related to length of the time. As described above, the OLT 200 informs the ONUs 210, 220 and 230 about the time starting the transmission and the length thereof using the GATE message 800.

In the present embodiment, the ONUs 210, 220 and 230 receive the GATE message 800 shown in FIG. 8. Then, the ONUs 210, 220 and 230 obtain values of the static start time field 801 and the length field 802, and transmits the frame in the EF queue 211-1 as long as the length information contained the length field 802 at the time defined in the static start time field 801. Then, the ONUs 210, 220 and 230 also obtains values of the dynamic start time field 803 and the length field 804 and transmit the frames in the AF queue 21101 and the BE queue 211-3 in proportional to the value recorded in the queue table as much as the length in the length field 804 at the time defined in the dynamic start time field 803.

Since the EF queue 211-1 supports the service that is very sensitive to delay and jitter, it is preferable to have the regular transmission time. If the OLT 200 assigns only one start time and a length thereof to the ONUs 210, 220 and 230, the transmission time of data stored in the AF queue 211-2 in each of the ONUs 210, 220 and 230 becomes more irregular due to the variability of frame length. Therefore, the QoS may be degraded thereby. In order to overcome the degradation of the QoS, an additional transmission period is allocated for the EF queue 211-1 of each of the ONUs 210, 220 and 230 within one cycle and a remained period of the one cycle obtained by subtracting the transmission period for the EF queue 211-1 from the entire transmission period of the one cycle is allocated for the AF queue and the BE queue 211-2 and 211-3.

Figure 9:
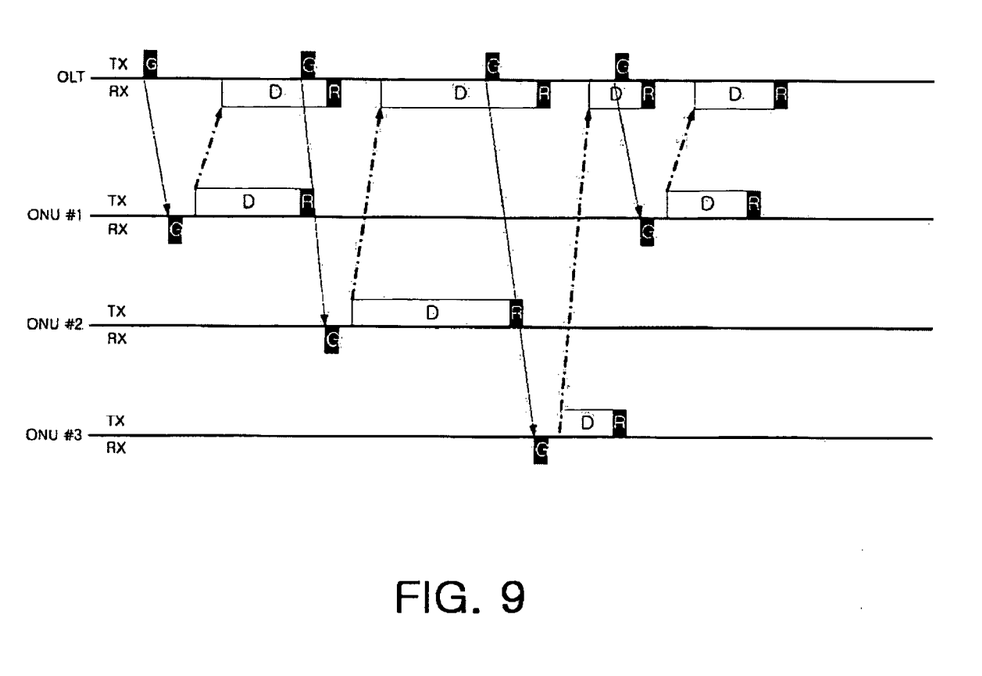
FIG. 9 shows data transmission according to a conventional IPACT.
Figure 10:
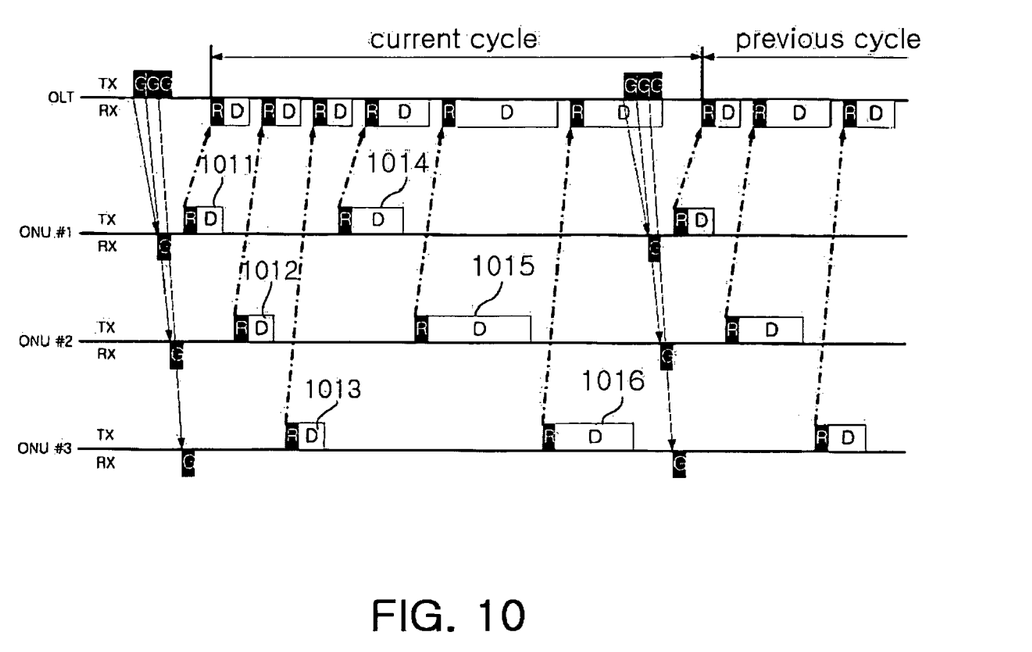
FIG. 10 shows data transmission according to an embodiment of the present invention.

FIG. 9 shows data transmission according to a conventional IPACT and FIG. 10 shows data transmission according to an embodiment of the present invention.

Referring to FIG. 9, in the conventional IPACT, if the OLT transmits the GATE message (G) to a plurality of ONUs #1 to #3, each of the ONUs #1 to #3 transmits data (D) and the REPORT message (R) to the OLT at a predetermined time in sequence. On the contrary, in the present embodiment, frames 1011, 1012 and 1013 for the EF class having the highest priority that are sensitive to delay and jitter are preferentially allocated to a front portion of one cycle and are transmitted to the OLT as shown in FIG. 10. Therefore, a regular delay and a constant jitter are guaranteed, and the differentiate service may be advantageously provided by transmitting frames 1014, 1015, 1016 for the AF class and the BE class after transmitting the frames for EF class.

The above described bandwidth allocating method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the bandwidth allocation device and the method thereof provides the QoS by effectively distributing the uplink frame to be transmitted from the ONU to the OLT according to its priority.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of allocating a bandwidth for guaranteeing QoS (quality of service) in an Ethernet passive optical network, the method comprising:

at each of a plurality of optical network units (ONUs), classifying uplink frames to be transmitted to an optical line terminal (OLT) into a plurality of classes according to a predetermined priority, and requesting the optical line terminal for a bandwidth according to the plurality of classes;

at the optical line terminal, allocating the requested bandwidths for a highest priority class among the plurality of classes; and at the optical line terminal, dynamically allocating bandwidths for a secondary priority class among the plurality of classes using the remained bandwidth after allocating the requested bandwidths to the highest priority class; and at the optical line terminal, dynamically allocating bandwidths for one or more other classes after allocating the requested bandwidth to the highest priority class and the secondary priority class, wherein when a sum of requested bandwidths for the secondary class requested by the optical network units is greater than the remained bandwidth, for each optical network unit, if a smaller value between a predefined maximum usable bandwidth of the optical network unit and a bandwidth requested by the optical network unit is greater than an available bandwidth (avail_$BW_{AF}$) to be allocated to the secondary class, the optical line terminal is to allocate a bandwidth to the optical network unit in proportional to a smaller value between a minimum guaranteed bandwidth of the optical network unit and the requested bandwidth requested by the optical network unit.

2. The method according to claim 1, wherein the plurality of the classes comprises an EF class having a highest priority for a frame that requires a guaranteed service and is sensitive to delay and jitter;

an AF class for a multimedia frame that is less sensitive to delay and jitter compared to the EF class and sensitive to packet loss; and a BE class for a frame requiring a best-effort service that is less sensitive to delay, jitter and loss.

3. The method according to claim 2, wherein in the dynamically allocating of the remained bandwidth, when a sum of the requested bandwidths for the AF classes requested by the optical network units is smaller than or equal to the remained bandwidth, the optical line terminal allocates a smaller value between the requested bandwidth and the redefined maximum usable bandwidth of the optical network unit.

4. The method according to claim 2, wherein in the dynamically allocating of the remained bandwidth, when a sum of the requested bandwidths for the AF classes requested by the optical network units is greater than the remained bandwidth, if a smaller value between the redefined maximum usable bandwidth of the optical network unit and a bandwidth requested by the optical network unit is smaller than an available bandwidth (avail_$BW_{AF}$) to be allocated to the AF class, the optical line terminal allocates a smaller value between the predefined maximum usable bandwidth of the optical network unit and a bandwidth requested by the optical network unit to the optical network unit.

5. The method according to claim 4, further comprising allocating a remained bandwidth to optical network units remained after excepting the optical network units that request a smaller value than the minimum guaranteed bandwidth predefined to each of the optical network units among the optical network units in proportional to the minimum guaranteed bandwidth of each of the optical network units.

6. The method according to claim 5, further comprising uniformly allocating the remained bandwidth, which is remained after allocating the bandwidth for the AF class, to optical network units that request a bandwidth for the BE class.

7. The method according to claim 1, further comprising allocating a remained bandwidth to optical network units remained after excepting the optical network units that request a smaller value than the minimum guaranteed bandwidth predefined to each of the optical network units among the optical network units in proportional to the minimum guaranteed bandwidth of each of the optical network units.

8. The method according to claim 2, further comprising uniformly allocating the remained bandwidth, which is remained after allocating the bandwidth for the AF class, to optical network units that request a bandwidth for the BE class.

9. The method according to claim 1, wherein frames for the highest priority class are preferentially allocated to a front portion of one cycle and transmitted, and then frames for other classes are transmitted.

10. A device for allocating bandwidth to guarantee QoS (quality of service) in an Ethernet passive optical network, the device comprising:
a plurality of optical network units for classifying uplink data to be transmitted to an optical line terminal into a plurality of classes according to a predetermined priority and transmitting the classified uplink data, and receiving an allocated bandwidth required for each of the classes from the optical line terminal; and
an optical line terminal for distributing bandwidths required for a highest priority class among the plurality classes from an entire available uplink bandwidth to the optical network units, dynamically distributing bandwidths for a secondary priority class among the plurality of classes using the remained bandwidth after distributing the requested bandwidths to the highest priority class, and subsequently, dynamically distributing bandwidths for one or more other classes,
wherein when a sum of requested bandwidths for the secondary class requested by the optical network units is greater than the remained bandwidth,
for each optical network unit, if a smaller value between a predefined maximum usable bandwidth of the optical network unit and a bandwidth requested by the optical network unit is greater than an available bandwidth ($avail\_BW_{AF}$) to be allocated to the secondary class, the optical line terminal is to allocate a bandwidth to the optical network unit in proportional to a smaller value between a minimum guaranteed bandwidth of the optical network unit and the requested bandwidth requested by the optical network unit.

11. An optical network unit (ONU) comprising:
a plurality of priority queues for classifying uplink data to be transmitted to an optical line terminal (OLT) into a plurality of classes according to a predetermined data priority, and storing the classified uplink data; and
a scheduler for transmitting the uplink data stored in the priority queue according to bandwidth allocation information received from the optical line terminal,
wherein a bandwidth allocated from the optical line terminal is allocated by distributing bandwidths required for a highest priority class among the classes from an entire available uplink bandwidth, dynamically distributing bandwidths for a secondary priority class among the plurality of classes using the remained bandwidth after distributing the requested bandwidths to the highest priority class, and subsequently, dynamically distributing bandwidths for one or more other classes,
wherein when a sum of requested bandwidths for the secondary class requested by the optical network units is greater than the remained bandwidth,
if a smaller value between a predefined maximum usable bandwidth of the optical network unit and a bandwidth requested by the optical network unit is greater than an available bandwidth ($avail\_BW_{AF}$) to be allocated to the secondary class, the optical line terminal is to allocate a bandwidth to the optical network unit in proportional to a smaller value between a minimum guaranteed bandwidth of the optical network unit and the requested bandwidth requested by the optical network unit.

12. The optical network unit according to claim 11, further comprising:
a storing unit for storing a queue state managing table containing cyclic queue state information for the plurality of the priority queues; and
a controlling unit for calculating a bandwidth to request to the optical line terminal using the queue state information for the plurality of the priority queues, and transmitting the information about the requested bandwidth to the optical line terminal.

13. The optical network unit according to claim 12, wherein the optical network unit transmits the information about the requested bandwidth to the optical line terminal through a REPORT message.

14. The optical network unit according to claim 12, wherein the optical network unit preferentially allocates a frame for the highest priority class to a front portion of one cycle and transmits the frame for the highest priority class to the optical line terminal, and then transmits frames for other classes.

15. An optical line terminal (OLT) comprising:
a storing unit for classifying uplink frames to be transmitted from a plurality of optical network units (ONUs) into a plurality of classes according to a predetermined priority, and storing a bandwidth managing table containing information about bandwidths requested according to predetermined priorities for each of the optical network units; and
a bandwidth allocating unit for distributing bandwidths required for a highest priority class among the classes from an entire available uplink bandwidth, dynamically distributing bandwidths for a secondary priority class among the plurality of classes using the remained bandwidth after distributing the requested bandwidths to the highest priority class, and subsequently, dynamically distributing bandwidths for one or more other classes,
wherein when a sum of requested bandwidths for the secondary class requested by the optical network units is greater than the remained bandwidth,
for each optical network unit, if a smaller value between a predefined maximum usable bandwidth of the optical network unit and a bandwidth requested by the optical network unit is greater than an available bandwidth ($avail\_BW_{AF}$) to be allocated to the secondary class, the optical line terminal is to allocate a bandwidth to the optical network unit in proportional to a smaller value between a minimum guaranteed bandwidth of the optical network unit and the requested bandwidth requested by the optical network unit.

16. The optical line terminal according to claim 15, wherein the plurality of classes comprise:
an EF class having a highest priority for a frame that requires a guaranteed service and is sensitive to delay and jitter;
an AF class for a multimedia frame that is less sensitive to delay and jitter compared to the EF class and sensitive to packet loss; and
a BE class for a frame requiring a best-effort service that is less sensitive to delay, jitter and loss.

17. The optical line terminal according to claim 16, wherein a bandwidth for the AF class is smaller than the redefined maximum bandwidth for the AF class while guaranteeing the minimum bandwidth for the AF class.

18. The optical line terminal according to claim 16, wherein, when a sum of the requested bandwidths for the AF classes requested by the optical network units is smaller than or equal to the remained bandwidth, the optical line terminal allocates a smaller value between the requested bandwidth and the redefined maximum usable bandwidth of the optical network unit.

19. The optical line terminal according to claim 16, wherein, when a sum of the requested bandwidths for the AF classes requested by the optical network units is greater than the remained bandwidth, if a smaller value between the predefined maximum usable bandwidth of the optical network unit and a bandwidth requested by the optical network unit is smaller than an available bandwidth ($avail\_BW_{AF}$) to be allocated to the AF class, the optical line terminal allocates a smaller value between the redefined maximum usable bandwidth of the optical network unit and a bandwidth requested by the optical network unit to the optical network unit.

20. The optical line terminal according to claim 19, wherein the optical line terminal allocates a remained bandwidth to optical network units which are remained after excepting the optical network units that request a smaller value than the minimum guaranteed bandwidth predefined to each of the optical network units among the optical network units in proportional to the minimum guaranteed bandwidth of each of the optical network units.

21. The optical line terminal according to one of claim 15, wherein the optical line terminal allocates a remained bandwidth to optical network units which are remained after excepting the optical network units that request a smaller value than the minimum guaranteed bandwidth predefined to each of the optical network units among the optical network units in proportional to the minimum guaranteed bandwidth of each of the optical network units.

22. The optical line terminal according to claim 16, wherein the optical line terminal uniformly allocates the remained bandwidth, which is remained after allocating the bandwidth for the AF class, to optical network units that request a bandwidth for the BE class.

23. The optical line terminal according to claim 15, wherein the optical line terminal transmits the information about the allocated bandwidth according to each class to the optical network unit using a GATE message, wherein a bandwidth for the AF class is smaller than the predefined maximum bandwidth for the AF class while guaranteeing the minimum bandwidth for the AF class.

* * * * *